Aug. 11, 1936.　　　F. W. SAMPSON　　　2,050,736
HYDRAULIC BRAKE CYLINDER
Filed Feb. 7, 1934

INVENTOR
Frederick W. Sampson
BY
Spencer Hardman & Fehr
HIS ATTORNEYS

Patented Aug. 11, 1936

2,050,736

UNITED STATES PATENT OFFICE 2,050,736

HYDRAULIC BRAKE CYLINDER

Frederick W. Sampson, Dayton, Ohio, assignor to General Motors Corporation, Detroit, Mich., a corporation of Delaware Application February 7, 1934, Serial No. 710,060

4 Claims. (Cl. 60—54.6)

This invention relates to hydraulic brake-expanding cylinders adapted for use in automobiles to expand the brake shoes against the brake drums by hydraulic pressure.

Present day hydraulic brake cylinders are more or less subject to leakage of the hydraulic oil or other fluid used to operate same, and require attention and repairs from time to time in order to maintain all packings, glands, etc., sufficiently tight to prevent leakage since if a substantial amount of leakage occurs the brakes will not operate satisfactorily if at all.

An object of this invention is to provide such a brake cylinder wherein the brake operating plungers are hermetically sealed to the cylinder by simple and efficient resilient rubber cones which permit the desired relative movement of the plungers by distortion of the rubber, and thus all sliding seals such as packings, glands, etc., are eliminated.

An important feature of this invention is the simplicity of construction and economy of manufacturing same due to the fact that the two flexible rubber cones are vulcanized in situ upon the cylinder and the two plungers while they are assembled together as a unit, and a strong bond between the rubber cones and the attached metal parts obtained in a simple manner.

Further objects and advantages of the present invention will be apparent from the following description, reference being had to the accompanying drawing, wherein a preferred embodiment of the present invention is clearly shown.

In the drawing.

Similar reference characters refer to similar parts throughout the several views.

Figure 3:
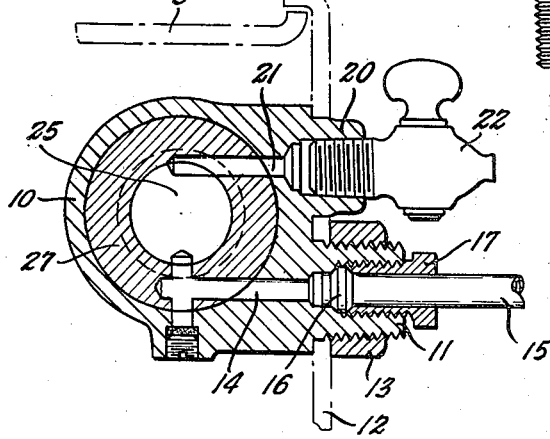
Fig. 3 is a transverse section on line 3—3 of Fig. 1, and shows how the brake cylinder is held fixed in place upon a stationary end plate adjacent the rotating brake drum.

The metal cylinder 10 is shown as a one piece casting having an externally threaded projecting portion 11 which projects through a hole in the stationary end plate 12 and is rigidly fixed thereto by the nut 13. This projection 11 is drilled through the center and provides a fluid inlet duct 14 which leads into the center of the cylinder 10. It is also counter-bored and serves as a pipe connection for the operating-fluid pipe 15 which may be fixed thereto in any suitable manner. Fig. 3 shows pipe 15 having an enlarged head 16 and a gland nut 17 which is screwed tightly thereagainst to seal the joint between pipe 15 and casting 10. Such pipe joints are well known. Casting 10 is provided with a second lug or boss 20 which preferably also fits snugly through a hole in end plate 12 and so aids in fixing the cylinder 10 thereto. A central bore 21 leads into the cylinder 10 and a suitable hand valve or petcock 22 is provided to open or close the exit of duct 21 at will.

Figure 2:
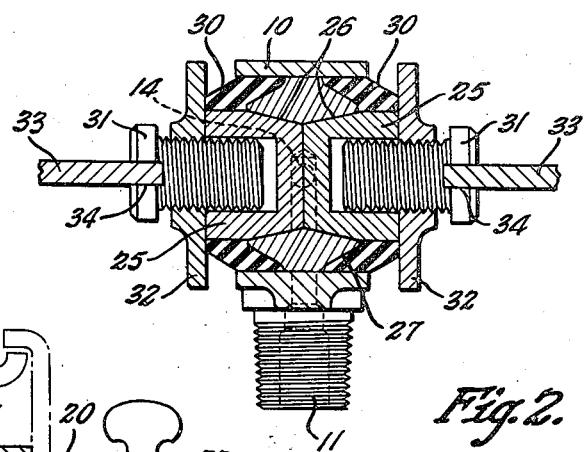
Fig. 2 is a longitudinal section on line 2—2 of Fig. 1.

Two metal plungers 25 contact each other when in their inmost position, as shown in Fig. 2, and are maintained in axial alignment with cylinder 10 by fitting snugly into the conical openings 26 in the central stationary filler block 27, which may be fixed to cylinder 10 by any suitable means. Two resilient rubber cones 30 are bonded by vulcanization to the interior surface of cylinder 10 and to the exterior surface of the plungers 25 and thus provide a complete hermetic seal between the plungers and the cylinder. Separation of the plungers 25 to expand the brake shoes is permitted by the stretching of the two rubber cones 30, and of course upon release of the actuating fluid pressure between plungers 25 the cones 30 will again draw the plungers to their nested position shown in Fig. 2.

The rubber cones 30 must be free from the central filler block 27, that is, not bonded by vulcanization thereto, in order that the full length of the cones 30 may be put in tension during the outward movement of plungers 25 and without causing any serious shearing stress on the rubber cones. For this reason the filler block 27 must have a surface to which the rubber cones will not bond during vulcanization in situ while they are being bonded to the cylinder 10 and the two plungers 25. The filler block 27 may be made of a hard nonmetallic material to which rubber will not bond, for example bakelite or hard wood, or it may be made of metal and given a coating of soap or some material just before the uncured rubber is assembled thereupon prior to vulcanization which will prevent the rubber bonding thereto.

Figure 1:
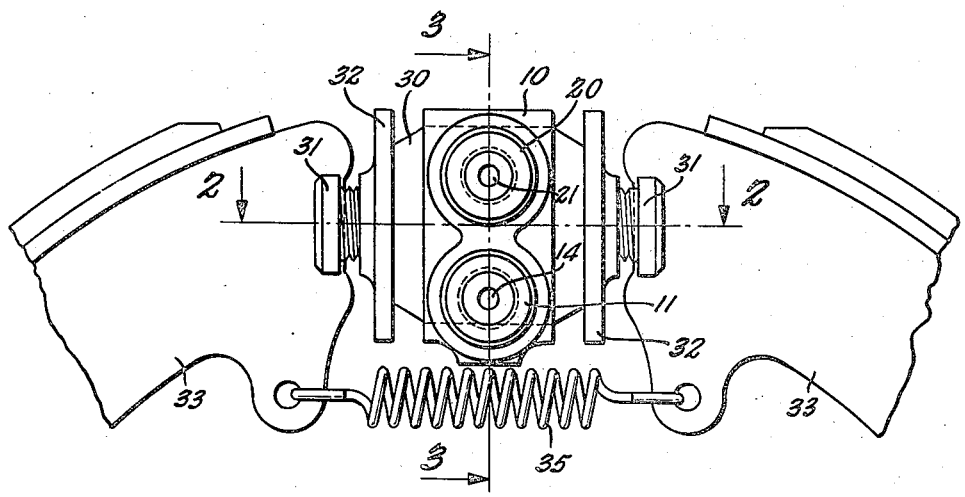
Fig. 1 is a side elevation of the brake cylinder of this invention in operating position between two brake shoes.

The two plungers 25 each has an adjustable push rod 31 held in place against its outer end by a large flat adjusting nut 32 and the two brake shoes 33 whose flat ends fit within kerfs 34 in the heads of the push rods 31. The two brake shoes 33 are urged toward each other by the interconnecting tension spring 35, shown in Fig. 1, and thus the two push rods 31 are at all times urged against the plungers 25. The coil spring 35 also aids in closing the plungers 25 to their nested position shown in Fig. 2 when the actuating hydraulic pressure is released.

In the manufacture of this device, the cylinder casting 10, the filler block 27 and the two plungers 25 are assembled together in their relation shown in Fig. 2, and the uncured rubber blanks to form the two cones 30 are put in place. This unit is then properly set in the vulcanizing mold and the rubber vulcanized in situ and strongly bonded by such vulcanization directly to the cylinder 10 and the two plungers 25 as described above, precautions having been taken to prevent the rubber also bonding to the filler block 27 as also described above. The remaining parts are easily assembled upon this unit after its removal from the vulcanizing mold.

In operation, the actuating high pressure fluid is admitted to the space between plungers 25 through the duct 14, which causes these plungers to separate and expand the brake shoes 33 against the surrounding brake drum 9. When the fluid pressure is released the fluid returns from cylinder 10 through the same duct 14. The pet-cock 22 is opened at the beginning to exhaust all the air from the pipe lines and thereafter maintained closed.

While the embodiment of the present invention as herein disclosed, constitutes a preferred form, it is to be understood that other forms might be adopted, all coming within the scope of the claims which follow.

I claim:—

1. A hydraulic expanding mechanism comprising: a cylinder, two oppositely expanding pistons movable into and out of opposite ends of said cylinder, means for admitting working fluid under pressure between the inner ends of said two pistons to force said pistons outwardly, and flexible rubber packing means hermetically sealing the joints between said cylinder and the relatively movable pistons, said packing means comprising for each piston a molded resilient rubber cone-shaped member having its outer and smaller end fixed and sealed to said piston and its inner and larger end fixed and sealed to said cylinder, whereby said rubber cones are put in free tension when said opposed pistons move outwardly.

2. A hydraulic expanding mechanism comprising: a cylinder having an inwardly tapered axial bore in each end thereof, two oppositely expanding pistons for said cylinder each having an inwardly tapered inner portion which seat upon said tapered bore in the cylinder when in fully closed position, means for admitting working fluid under pressure between the inner ends of said two pistons to force said piston outwardly, and a molded resilient rubber cone-shaped member for sealing each piston, each of said rubber cones having its outer and smaller end fixed and sealed to its piston and its inner and larger end fixed and sealed to said cylinder, whereby said rubber members are put in free tension when said pistons move outwardly.

3. A hydraulic expanding mechanism comprising: a cylinder, two oppositely expanding pistons movable into and out of opposite ends of said cylinder, means for admitting working fluid under pressure between the inner ends of said two pistons to force said pistons outwardly, and flexible rubber packing means hermetically sealing the joints between said cylinder and the relatively movable pistons, said packing means comprising for each piston, a molded resilient rubber frustro-conical member having its outer and smaller end bonded by vulcanization in situ to said piston and its inner and larger end bonded by vulcanization in situ to said cylinder whereby said pistons and cylinder are permanently assembled together when the rubber members are molded.

4. A hydraulic expanding mechanism comprising: a cylinder having an inwardly tapered axial bore in each end thereof, two oppositely expanding pistons for said cylinder each having an inwardly tapered inner portion which seat upon said tapered bore in the cylinder when in fully closed position, means for admitting working fluid under pressure between the inner ends of said two pistons to force said pistons outwardly, and sealing means between said pistons and cylinder comprising for each piston a molded resilient rubber tapered annulus having its axially outer end surrounding and fixed to the portion of its piston projecting outwardly beyond the cylinder, and having an axially inner portion thereof fixed to the cylinder exterior to the tapered axial bore therein.

FREDERICK W. SAMPSON.